Dec. 27, 1966

J. G. ZUBATY 3,294,204

ANTI-SKID BRAKE

Filed Sept. 15, 1964

INVENTOR.
Joseph G. Zubaty
BY
Donald P. Selvecki
His Attorney

United States Patent Office 3,294,204
Patented Dec. 27, 1966

3,294,204
ANTI-SKID BRAKE
Joseph G. Zubaty, Flint, Mich., assignor to General Motors Corporation, Detroit, Mich., a corporation of Delaware
Filed Sept. 15, 1964, Ser. No. 396,545
5 Claims. (Cl. 188—181)

This invention relates to disc brakes and more particularly to an anti-skid device for use with a disc braking system.

Motor vehicles equipped with a disc brake of the type including a disc rotatable with a vehicle wheel, that is adapted to be laterally engaged by frictional elements, can be brought into a skid condition. This can occur when sufficient force is exerted on the rotatable disc by non-rotatable friction elements to prevent relative movement therebetween. When this condition occurs in one of the vehicle wheels so equipped while the vehicle still has a forward component of force, a skidding wheel will result. Sliding friction is substantially less than rolling friction and, therefore, further stopping of the vehicle is adversely affected by a skidding wheel.

It is an object of the present invention to provide an improved fluid control mechanism designed to work in conjunction with a disc brake which shuts off hydraulic pressure to a disc brake carried by a wheel encountering a skid condition.

It is another object of the present invention to provide an improved anti-skid mechanism for a disc brake that utilizes a force created by the servo action of a disc acting against frictional elements engageable therewith to shut off hydraulic pressure to the affected disc brake when relative movement between the disc and the frictional element ceases.

It is still another object of the present invention to provide an improved fluid control mechanism for use with a disc brake system which acts in a conventional manner to release the disc brakes when hydraulic pressure in the braking system is reduced and which operates as an anti-skid device to automatically release the hydraulic pressure acting on the braking system when the wheel being braked becomes locked.

It is a further object of the present invention to provide an improved anti-skid device for use with a disc brake system which utilizes a mechanical movement of a portion of the braking system generated by a brake application to release the wheel brake automatically by a reactive mechanical movement when the wheel being braked becomes locked.

Further objects and advantages of the present invention will be apparent from the following description, reference being had to the accompanying drawings wherein a preferred embodiment of the present invention is clearly shown.

Figure 1:
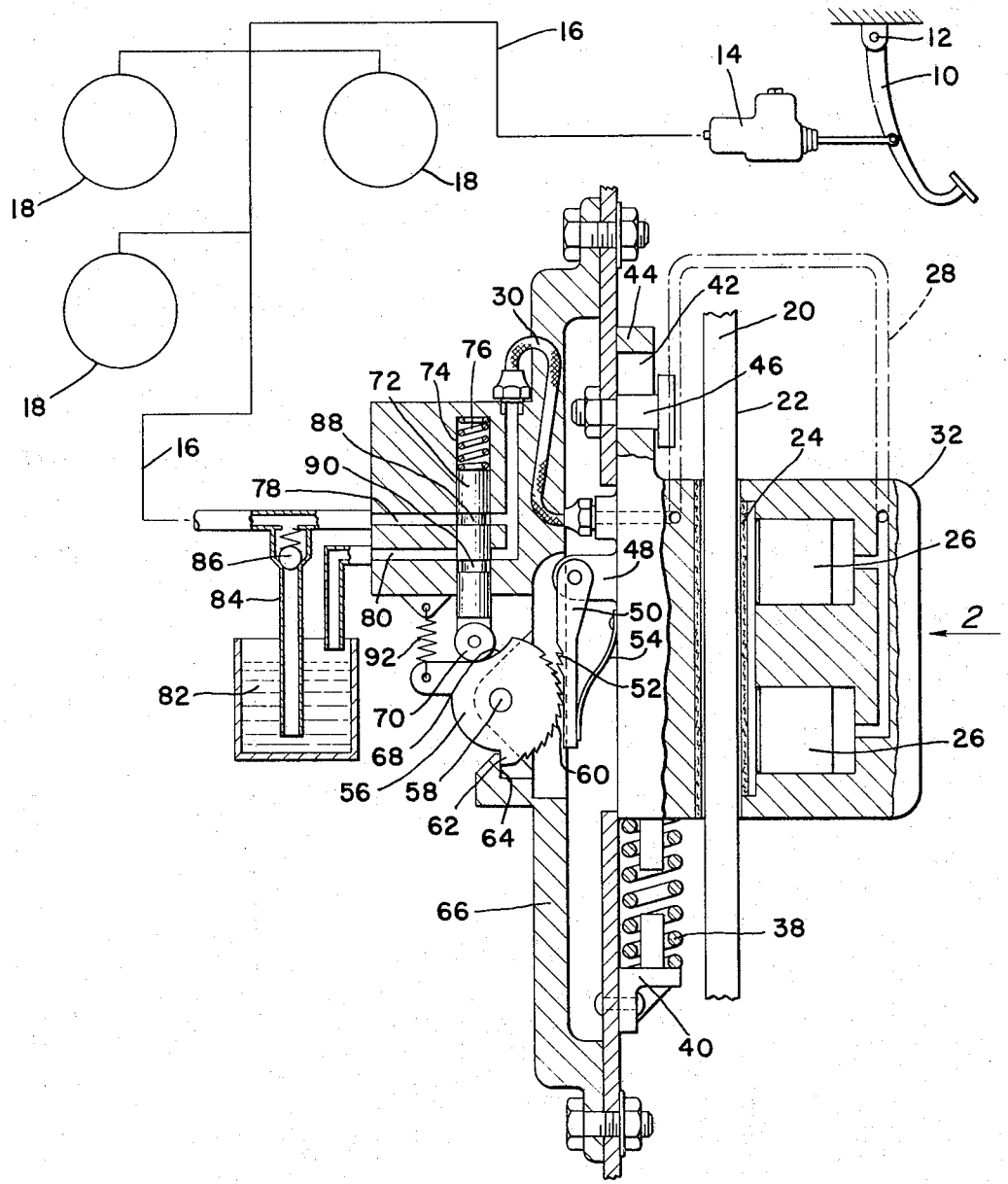
FIGURE 1 is a sectional view of the subject invention shown in a diagrammatic illustration of a vehicle braking system.

Referring now to FIGURE 1, a brake pedal 10 is pivotally supported from a fixed portion of a vehicle at pivot point 12 and is adapted to generate a pressure in a conventional hydraulic master cylinder 14 in response to pressure on the pedal 12. Hydraulic pressure is thereafter communicated through lines 16 to wheels 18 of a vehicle.

In the sectional view in FIGURE 1, a typical wheel 18 is illustrated wherein a disc 20 is rotatable with the vehicle wheel and is adapted to be engaged on a surface 22 by friction means 24. The friction means 24 is normally carried in juxtaposition to the surface 22 and is responsive to hydraulic pressure acting on hydraulic cylinders 26 communicating with the inlet line 16 through lines 28 and 30. It is evident, therefore, that hydraulic pressure in lines 16 from the master cylinder 14 will be communicated through the flexible line 30 through a line 28 into the cylinders 26 to move the friction means 24 into frictional engagement with the surface 22 to provide a braking action.

Figure 2:
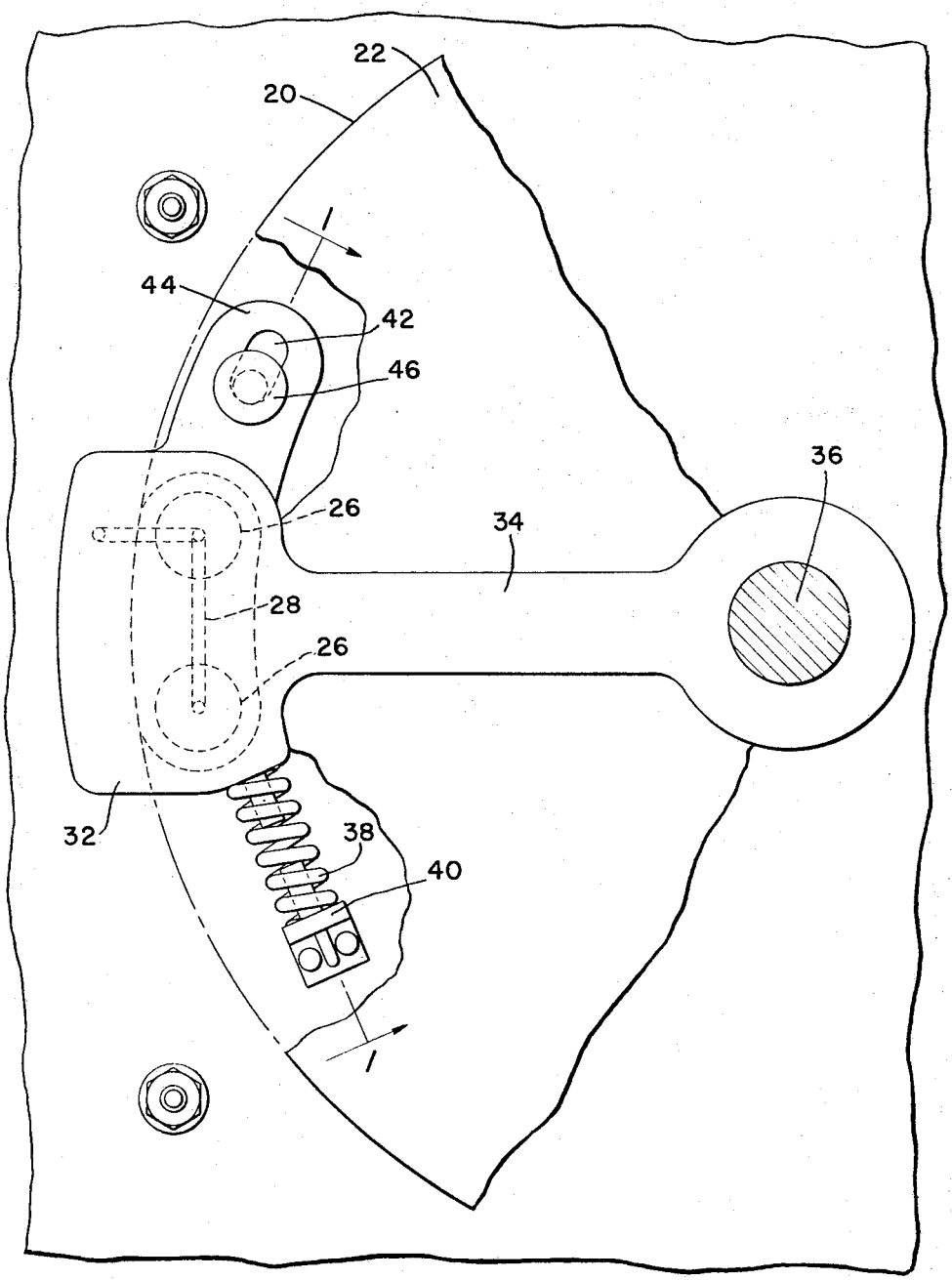
FIGURE 2 is a partial elevational view of the subject invention viewed in the direction of the arrow 2 of FIGURE 1.

Referring now to FIGURE 2, the cylinders 26 are carried by housing 32. The housing 32 is formed as an extension of an arm 34 that is adapted to pivot at 36 which is a point common to the axis of the disc 20. A spring 38 is carried by a bracket 40 mounted to a fixed portion of the vehicle and engages one side of the housing 32 to restrict the pivotal movement thereof in one direction. A slot 42 formed in an extension 44 of the housing 32 cooperates with a pin 46 to limit the pivotal movement of the housing 32 in the opposite direction. It therefore becomes apparent that the housing 32 is arranged to be pivoted in a controlled manner against the compression of the spring 38 as limited by the slot 42.

Referring now to FIGURE 1, a bracket 48 carried by another portion of the pivotable housing 32 provides a pivotal mounting for a rack 50 having a geared portion 52. A resilient element 54 is also carried by the housing 32 and urges the rack 50 away from the housing 32 in a clockwise manner on its pivotal mounting.

A pivotable elment 56 is adapted to rotate on a pivot point 58 carried by a fixed portion of the vehicle. The element 56 has a geared portion 60 arranged to cooperate with the geared portion 52 during a return movement of the housing 32 in a manner to be hereinafter described. An extended flange 62 cooperates with a stop 64 formed as an integral part of a mounting bracket 66 carried by a fixed portion of the vehicle to limit the pivotal movement of the element 56 in one direction.

The pivotable element 56 includes a cam surface 68 arranged to cooperate with a cam follower 70 formed as an extension of a spool valve 72. The spool valve 72 is slidably disposed in a bore 74 formed as a portion of the mounting bracket 66 and is biased in the direction of the cam portion 68 by spring 76.

A passage 78 formed in the bracket 66 provides a path for fluid communication between a relatively rigid line 16 and a flexible line 30. A passage 80 likewise formed in the bracket 66 provides a path for fluid communication between the flexible line 30 and an hydraulic reservoir 82. A line 84 from the reservoir 82 contains a spring loaded ball check valve 86. The line 84 provides a path for pressure communication between the reservoir 82 and the passage 78. The spool valve 72 has peripheral grooves 88 and 90 that are arranged to provide an open path for fluid communication in the passages 78 and 80 respectively. When the spool valve 72 is positioned at the lowest point on the cam portion 68, the peripheral groove 88 provides a path for free fluid communication in the passage 78. When the spool valve 72 is positioned against the highest portion of the cam portion 68, the passage 78 is closed off and the peripheral groove 90 provides a path for free fluid communication in the passage 80.

In operation, referring to FIGURE 1, pressure is exerted on the pedal 10 to rotate it about the pivot 12 in a manner developing an hydraulic pressure in the hydraulic master cylinder 14. This pressure is communicated through the lines 16 and 30 to the wheels 18. During a normal braking action, the pressure is transmitted through the passage 78 through the peripheral groove 88 into the flexible line 30. The pressure is then communicated through the line 28 into the cylinders 26. It is understood that cycle of operation herein described is for one wheel and it is obvious that a similar cycle takes place at the other wheel cylinders of the vehicle involved that are similarly equipped.

Force against the friction means 24 is developed by pressure from the wheel cylinders 26 and the force is exerted against the surface 22 of the disc 20. The disc 20, rotating with the vehicle wheel, is impeded against further rotational movement and a braking action occurs.

Referring now to FIGURE 2 and presuming the direction of rotation of the disc to be counterclockwise, the housing 32 carrying the friction means 24 likewise tends to rotate in a counterclockwise manner about its pivot 36. This is the normal servo action generated when a friction element comes into sliding contact with a moving opposed member. The housing 32 is pressed downwardly, as viewed in FIGURE 2, so that the spring 38 is compressed. It is clear that the clearance in the slot 42 allows the extension 44 of the housing 32 to follow in this movement. It should be noted that this force is exerted against the spring 38 only during the period of time when a sliding force is exerted against the friction means 24.

Referring now to FIGURE 1, it is assumed that pressure is released from the pedal 10 and the force in the cylinders 26 is released from the friction means 24. The sliding friction between the disc 20 and the friction means 24 decreases and the compressed spring 38 drives the housing 32 upwardly, as viewed in FIGURE 1. As this occurs, the rack 50, carrying the geared portion 52, having been driven across the geared portion 60 of the pivotable element 56 during the servo action previously described, now engages the geared portion 60 and rotates the pivotable element 56 in a counterclockwise fashion. As the pivotable element 56 rotates in a counterclockwise manner against the force of a spring 92, the cam portion 68 of the element 56 forces the cam follower 70 upwardly, as viewed in FIGURE 1. As this occurs, the spool valve 72 sequentially shuts off fluid communication through the passage 78 and then the peripheral groove 90 is positioned across the passage 80 to provide free fluid communication therethrough. Any pressure trapped in the lines 28 and 30 is relieved through the passage 80 into the reservoir 82. The spring loaded ball check valve 86 maintains a predetermined pressure in the reservoir 82.

As the geared portion 52 clears the geared portion 60 of the element 56, the spring 76 behind the spool valve 72 becomes dominant and drives the pivotable element 56 in a clockwise fashion, as viewed in FIGURE 1. A spring 92 assists in this movement and serves to hold the element 56 through the flange 62 positively seated against the stop 64. In this manner, a complete cycle of the subject device has taken place in which the disc 20 has been impeded in its rotation but has not been completely stopped.

The functioning of the subject device as an anti-skid mechanism is brought about when the disc 20 is completely impeded in its rotation by a force against the friction means 24 of a sufficient magnitude to lock the brake. To illustrate, this anti-skid cycle takes place in the same manner as previously described to a point where sufficient force is exerted against the friction means 24 to completely stop the rotating disc 20. The force exerted by the rotating disc 20, commonly called a servo action, against the pivoted housing 32 ceases. Referring now to FIGURE 2, a spring 38 is so designed to have a greater force than the holding force of the friction means 24 against the disc 20. Therefore, when the disc becomes locked against further rotation, the spring 38 will drive the housing 32 in a clockwise direction, as viewed in FIGURE 2.

Referring to FIGURE 1, the clockwise movement of the housing 32 is seen as an upward movement of said housing in the sectional view in FIGURE 1. It is obvious then that this motion is identical to the motion engendered by a release of force against a brake pedal 10. The spool valve 72 will be driven upwardly, as viewed in FIGURE 1, in much the same manner as previously described and the force holding the disc 20 against rotation will be diminished. The disc 20 will therefore resume its rotation and a new servo action will result. If the force against the pedal 10 is maintained, the cycle herein described will be repeated as the disc 10 becomes locked. It is then obvious that force against the disc 20 will be relieved and a skidding of the vehicle wheel associated therewith will be avoided.

Utility of the subject device is obvious in an environment where the mechanical movement generated during a servo action can be utilized to release the force ultimately causing the servo action to come about. Such an environment is in the braking system of a motor vehicle where such a force is normally generated. It is understood that the mechanism described herein can be mounted on any or all of a vehicle's brakes to prevent lock-up thereof and a consequent skid.

While the system described finds particular utility in a disc braking system, it is well known that a similar servo action takes place on a band brake and the mechanism described herein is easily adaptable for use as an anti-skid device with such a mechanism. It is equally as obvious that the hydraulic system described herein might be a positive or negative air pressure system which pressure can be similarly controlled by use of the subject invention.

While the embodiment of the present invention, as herein disclosed, constitutes a preferred form, it is to be understood that other forms might be adopted.

What is claimed is as follows:

1. Fluid control mechanism for preventing a skid of a vehicle having disc brakes, said fluid control mechanism comprising: hydraulic pressure source means; first means having a disc shape and carried by a vehicle wheel and arranged to rotate therewith; friction means responsive to pressure from said hydraulic pressure source means to engage said disc and impede the rotation thereof thereby providing a braking means for the vehicle; second means pivotable on the axis of the disc and carrying said friction means, said first means adapted to move on the periphery of the first means in an arcuate path during a braking condition thereby generating a force; resilient means mounted to a fixed portion of the vehicle relative to the first means and arranged to control the movement of said second means; third means engageable by said second means on returning to a position of rest after a pivotal movement; said third means including a pivotable cam and cam follower; and fourth means adapted to control pressure from the hydraulic pressure source means and including a portion responsive to said cam portion during a pivoting movement thereof to prevent a further pressure response of said friction means to said hydraulic pressure source means and sequentially releasing any hydraulic pressure acting on the friction means at that time; said second means being drivable in an opposite direction to wheel rotation by said resilient means when a condition of no relative movement between the first means and the second means occurs during a braking action thereby preventing a skid of the vehicle wheel due to brake lock-up.

2. Fluid control mechanism according to claim 1 wherein the first means is a disc for a disc brake arrangement.

3. Fluid control mechanism according to claim 1 wherein the second means is a caliper-type housing and carries the friction means in juxtaposition to the rotatable disc and is responsive to a pressure build-up in the hydraulic pressure source means to effect a braking action on the rotatable disc.

4. Fluid control mechanism according to claim 1 wherein the third means includes a pivotable member having a gear portion and a cam portion, said third means including a pivotable rack carried by the second means and engageable with the gear portion of the pivotable member to pivot said member in a manner camming the fourth means into a pressure releasing condition.

5. Fluid control mechanism according to claim 1 wherein the fourth means is a sliding spool valve responsive to the cam portion of the third means and including a portion adapted to shut off hydraulic pressure to the friction means and a portion adapted to release pressure acting on the friction means during a condition where the rotatable disc and the first means are stationary relative to one another during a braking condition thereby preventing a skid of the vehicle wheel.

References Cited by the Examiner

UNITED STATES PATENTS

| 1,537,365 | 5/1925 | Muller | 188—181 X |
| 2,781,871 | 2/1957 | Alterkruse | 188—181 X |
| 2,904,136 | 9/1959 | Greenough | 188—181 |

DUANE A. REGER, *Primary Examiner.*